United States Patent
Ruan

(10) Patent No.: US 12,524,206 B2
(45) Date of Patent: Jan. 13, 2026

(54) CIRCUITS AND METHODS FOR MULTIPLYING LARGE INTEGERS OVER A FINITE FIELD

(71) Applicant: Xilinx, Inc., San Jose, CA (US)

(72) Inventor: Ming Ruan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 1052 days.

(21) Appl. No.: 17/523,259

(22) Filed: Nov. 10, 2021

(65) Prior Publication Data

US 2023/0142818 A1    May 11, 2023

(51) Int. Cl.
| | |
|---|---|
| G06F 7/544 | (2006.01) |
| G06F 5/01 | (2006.01) |
| G06F 7/523 | (2006.01) |
| G06F 7/72 | (2006.01) |

(52) U.S. Cl.
CPC .............. *G06F 7/5443* (2013.01); *G06F 5/01* (2013.01); *G06F 7/523* (2013.01); *G06F 7/727* (2013.01)

(58) Field of Classification Search
CPC .......... G06F 7/722; G06F 7/724; G06F 7/727; G06F 7/523; G06F 7/5443; G06F 5/01
See application file for complete search history.

(56) References Cited

PUBLICATIONS

D.A. Patterson et al., Computer Organization and Design, The Hardware/Software Interface, 5th Edition, Elsevier, 2014 (Year: 2014).*
U. Gadriwala, et al., Accelerating Poly1305 Cryptographic Message Authentication on the z14, Proceedings of CASCON 2017, ACM 2017 (Year: 2017).*
K. Leboeuf et al., High Performance Prime Field Multiplication for GPU, IEEE 2012 (Year: 2012).*
K.C. Pabbuleti et al., SIMD Acceleration of Modular Arithmetic on Contemporary Embedded Platforms, IEEE 2013 (Year: 2013).*
Xlnx, Versal ACAP DSP Engine, Architecture Manual, www.xilinx.com, AM004 (v1.1.2), Jul. 15, 2021.
Sreyosi Bhattacharyya, et al., Improved SIMD Implementation of Poly1305, Oct. 1, 2019.
Johann Groszschaedl, A Low-Power Bit-Serial Multiplier for Finite Fields GF(2m), Proceedings of the 34th IEEE International Symposium on Circuits and Systems (ISCAS 2001), vol. IV, pp. 37-40. © IEEE 2001.

* cited by examiner

*Primary Examiner* — Emily E Larocque
(74) *Attorney, Agent, or Firm* — Patterson + Sheridan, LLP

(57) ABSTRACT

Multiplication of integers over a finite field involves an array of arithmetic circuits configured to input a-limbs, d-limbs, and r-limbs. The array determines an intermediate term, Z, having z-limbs 0 through K by determining respective sets of intermediate z-limbs 0 through K−1 for r-limbs i for i=0 to K−1, and summing corresponding ones of the intermediate z-limbs of sets i through K−1. The arithmetic circuits determine for r-limb 0, intermediate z-limbs 0 through K−1 of set 0 as products of r-limb 0 and a-limbs 0 through K−1, and for the remaining r-limbs determines intermediate z-limbs using different combinations of a-limbs, r-limbs, modulus, and d-limbs. A modulo circuit computes Gas (most significant M bits of $Z*m$)+(least significant Q bits of Z, wherein Mis a number of bits by which a number of bits of Z exceeds N, and Q is equal to M+ceil ($\log_2$ m), and increases G by m if bits Q through N−1 of Z all having bit value one, and $G \geq 2^Q - m$. Circuitry assigns bits G bits 0 through Q−1 to Y bits 0 through Q−1, and G bit Q to Y bit Q.

20 Claims, 4 Drawing Sheets

US 12,524,206 B2

CIRCUITS AND METHODS FOR MULTIPLYING LARGE INTEGERS OVER A FINITE FIELD

TECHNICAL FIELD

The disclosure generally relates to circuits for multiplying large integers over a finite field.

BACKGROUND

A fundamental calculation performed in many cryptographic applications is multiplication of large numbers over a finite field. For example, the Poly1305 message authentication code (MAC) can be used to verify the authenticity of a message and involves multiplication of 130-bit unsigned integers over a prime field ($2^{130}-5$).

An exemplary algorithm for simplifying the multiplication divides the operands (multiplicand, multiplier, addend) into limbs, which are multiplied and accumulated. According to prior approaches, the bit-width, N, of the multiplication operands are assumed to be an integer multiple of the limb bit-width and the availability of general-purpose 32×32-bit multipliers. For example, a 130-bit operand can be divided into 5 limbs, each having 26-bits of the 130-bit term. The exemplary decomposition can be conveniently implemented on parallel 32-bit processors. However, a processor-based implementation may create issues of latency and/or throughput in some applications.

A hardware implementation that multiplies large numbers over a finite field can reduce latency and improve throughput relative to a processor-based implementation. Application specific integrated circuits (ASICs) and field programmable gate arrays (FPGAs) are examples of such hardware. However, a hardware implementation may not be easily realized.

Previous algorithms require an N-bit operand to be divided into K limbs where N is an integer multiple of K. For example, the limbs can be 5 bits, 13 bits or 26 bits in calculating the Poly1305 code. For an FPGA implementation, these bit widths may not map efficiently to an FPGA implementation in which specialized arithmetic circuits have a different maximum bit width (e.g., 23 bits). An ASIC implementation may be complex and costly and lack the flexibility of an FPGA.

SUMMARY

A disclosed circuit arrangement includes an array of arithmetic circuits and a modulo circuit. The array of arithmetic circuits is configured to input a-limbs, d-limbs, r-limbs, of N-bit operands. The a-limbs include a-limbs 0 through K−2 of l bits and a-limb K−1 of j bits of a first operand, the d-limbs include d-limbs 1 through K−1 of l bits and d-limb 0 of j bits of the first operand, and the r-limbs include r-limbs 0 through K−2 of l bits and r-limb K−1 of j bits of a second operand. The array of arithmetic circuits is configured to determine an intermediate term, Z, having z-limbs 0 through K by determining respective sets of intermediate z-limbs 0 through K−1 for r-limbs i for i=0 to K−1, and summing corresponding ones of the intermediate z-limbs of sets i through K−1. For r-limb 0, the array determines intermediate z-limbs 0 through K−1 of set 0 as products of r-limb 0 and a-limbs 0 through K−1. For each r-limb i, for i from 1 to K−1, the array determines the intermediate z-limb s from s=0 to i−1 of set i, as a product of modulus, m, d-limb (K−i+s), and r-limb i; the intermediate z-limb K−1 of set i, as a product of j low-order bits of a-limb (K−1−i) and r-limb i; and the intermediate z-limb s from s=i to K−2 of set i, as a product of r-limb i and a-limb t for t=0 to K−2−i. The modulo circuit is configured to compute G as (most significant M bits of Z*m)+(least significant Q bits of Z). M is a number of bits by which a number of bits of Z exceeds N, and Q is equal to M+ceil ($\log_2$ m). The modulo circuit increases G by m in response to bits Q through N−1 of Z all having bit value one, and G≥$2^Q$−m and assigns bits G bits 0 through Q−1 to Y bits 0 through Q−1, and G bit Q to Y bit Q.

A disclosed method includes inputting a-limbs, d-limbs, r-limbs, of N-bit operands to a plurality of arithmetic circuits. The a-limbs include a-limbs 0 through K−2 of l bits and a-limb K−1 of j bits of a first operand; the d-limbs include d-limbs 1 through K−1 of l bits and d-limb 0 of j bits of the first operand; and the r-limbs include r-limbs 0 through K−2 of l bits and r-limb K−1 of j bits of a second operand. The arithmetic circuits determine an intermediate term, Z, having z-limbs 0 through K, which includes determining a respective set of intermediate z-limbs 0 through K−1 for each r-limb i for i=0 to K−1. For r-limb 0, the determining includes determining intermediate z-limbs 0 through K−1 of set 0 as products of r-limb 0 and a-limbs 0 through K−1. For each r-limb i, for i from 1 to K−1, the determining includes determining for each intermediate z-limb s from s=0 to i−1 of set i, the intermediate z-limb s as a product of modulus, m, d-limb (K−i+s), and r-limb i; determining intermediate z-limb K−1 of set i as a product of j low-order bits of a-limb (K−1−i) and r-limb i; and determining for each intermediate z-limb s from s=i to K−2 of set i, the intermediate z-limb s as a product of r-limb i and a-limb t for t=0 to K−2−i. The method includes determining each z-limb as a sum of corresponding ones of the intermediate z-limbs of sets i through K−1. The method includes a modulo circuit computing a value of G as (most significant M bits of Z*m)+(least significant Q bits of Z). M is a number of bits by which a number of bits of Z exceeds N, and Q is equal to M+ceil ($\log_2$ m). The modulo circuit increases G by m in response to bits Q through N−1 of Z all having bit value one, and G≥$2^Q$−m, and assigns bits G bits 0 through Q−1 to Y bits 0 through Q−1, and G bit Q to Y bit Q.

Other features will be recognized from consideration of the Detailed Description and Claims, which follow.

BRIEF DESCRIPTION OF THE DRAWINGS

Various aspects and features of the disclosed circuits and methods will become apparent upon review of the following detailed description and upon reference to the drawings in which.

DETAILED DESCRIPTION

Figure 1:
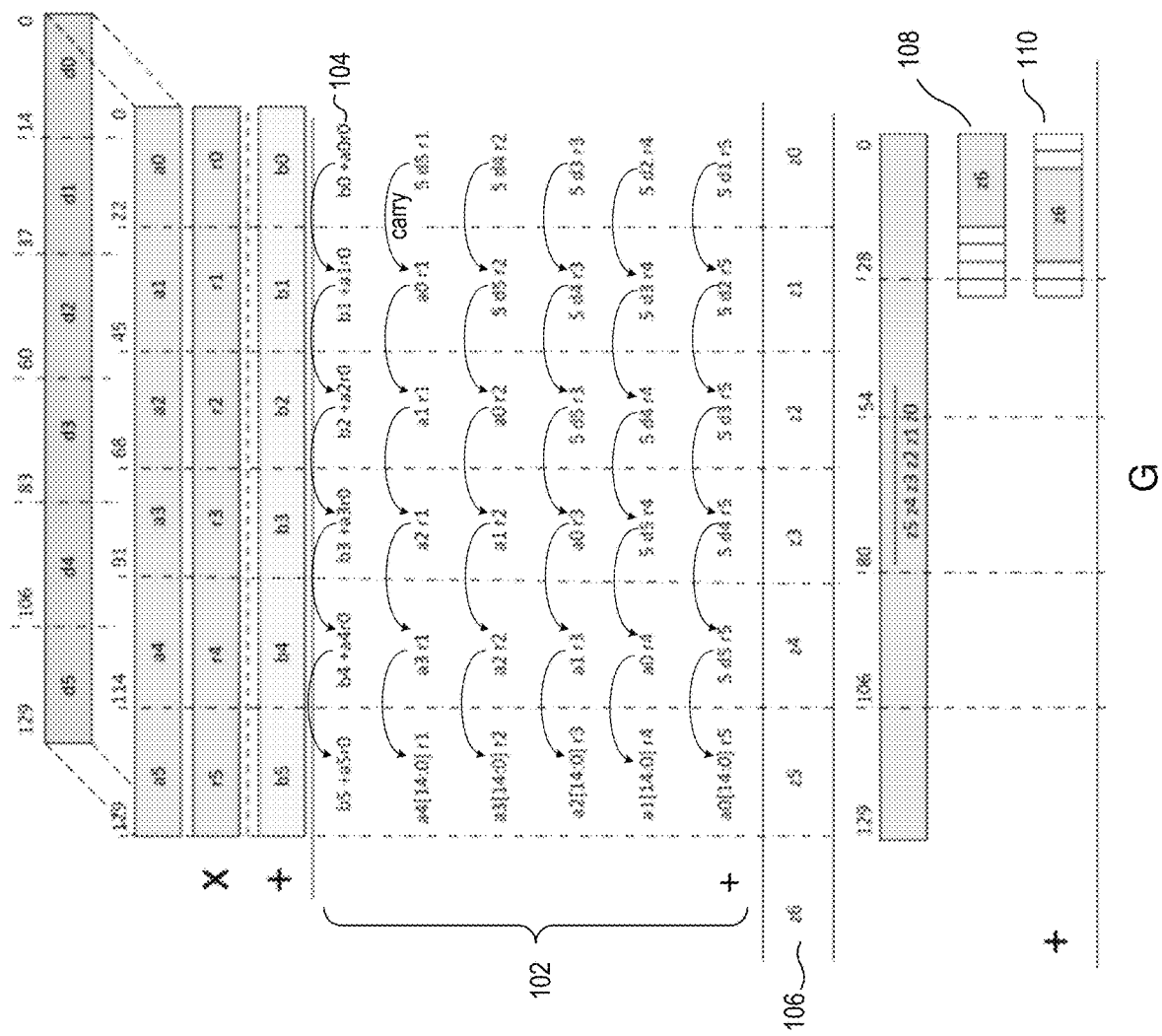
FIG. 1 illustrates an example that shows how the disclosed methods and circuits can be applied to computation of a Poly1305 code.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches provide flexibility in the selection of the bit-width of limbs in performing multiplication over a finite field. The flexibility in limb-width can enable high performance hardware implementations, both in FPGAs and ASICs. The method and circuits can be efficiently mapped to arithmetic circuits of FPGAS according to the supported maximum bit width. For ASIC implementations, the flexibility in limb-width selection can reduce area and power consumption.

According to the disclosed circuits and methods, large integer operands are partitioned into limbs having a bit-width that is compatible with arithmetic circuits of target hardware, and the operand bit-width need not be an integer multiple of the number of limbs. Exemplary arithmetic circuits include DSP48 and DSP58 circuits found in programmable devices from Xilinx, Inc. Notably, one of the operands is partitioned into two sets of limbs, and the other operand is partitioned into one set of limbs. One set of the two sets of limbs of the one operand has limbs resulting from partitioning the operand from the least significant bit (LSB) to the most significant bit (MSB), and the other set of the two sets has limbs resulting from partitioning the operand from the MSB to the LSB. The set of limbs of the other operand are a result of partitioning the other operand from the LSB to the MSB. Once partitioned, the two sets of limbs of the one operand and the one set of limbs of the other operand can be input to an array of arithmetic circuits that multiply and accumulate partial products of the limbs to produce an intermediate value, Z. A modulo circuit computes the final value Y as a function of Z, the modulus, m, and the bit-width Z relative to the bit-width of the operands.

The basis for partitioning the large operands, the configuration of the array of arithmetic circuits, and the logic of the modulo circuit is described below. Multiplication of two N-bit integers, A and R, over a finite field, $P=2^N-m$, is defined as: $Y=(A*R+B)$ mod P. The modulus, m, is a small integer for ease of implementation.

Though the disclosed methods and circuits are described with examples that involve addition of the B term to the product of the large integers, it will be recognized that the multiplication and modulo methods and circuits can also be applied to implementations that do involve adding a term to the product. Thus, the addition of the B term is optional in the methods and circuits.

The large integers can be partitioned into as a summation of K smaller integers that are referred to as "limbs." The first (K−1) limbs from LSB to MSB have bit-width l, the last limb (Kth limb) has bit-width j, where $j=N-(K-1)\cdot l$ and $j \le l$. The large integers can be expressed as the following summations:

$$A = \sum_{k=0}^{K-2} a_k \cdot 2^{k \cdot l} + \hat{a}_{K-1} \cdot 2^{(K-1) \cdot l}$$

$$A_{N-1ij} = \sum_{k=1}^{K-1} d_k \cdot 2^{(k-1) \cdot l}$$

-continued $$R = \sum_{k=0}^{K-1} r_k \cdot 2^{k \cdot l}$$

$$B = \sum_{k=0}^{K-1} b_k \cdot 2^{k \cdot l}$$

where:

$a_k = A_{(k+1)l-1:kl}, k \in [0, K-2];$    $l$ – bits $\hat{a}_k = A_{(kl+j-1):kl}$    $j$ – bits $d_k = A_{j+kl-1:j+(k-1)l}, k \in [1, K-1];$    $l$ – bits $r_k = R_{(k+1)l-1:kl}, k \in [0, K-2];$    $l$ – bits $r_{K-1} = R_{N-1:(K-1)l}$    $j$ – bits $b_k = B_{(k+1)l-1:kl}, k \in [0, K-2];$    $l$ – bits $b_{K-1} = B_{N-1:(K-1)l}$    $j$ – bits Note that $\hat{a}_k$ is defined to be the least significant j bits of $a_k$.

The large integer multiplication over a finite field entails two main steps, multiplication and modulo. The following derivation demonstrates how the limbs of the partitioned operands can be multiplied and accumulated into an intermediate term, Z, in preparation for the modulo step. In the following derivation = means equal, and ≡ represents equal in modulo arithmetic.

$$Z = A*R + B = \sum_{k=0}^{K-1} 2^{lk} \cdot r_k \cdot A_{N-1:0} + \sum_{k=0}^{K-1} 2^{lk} b_k =$$

$$\sum_{k=0}^{K-1} 2^{lk} \cdot (r_k \cdot A_{N-1-lk:0}) + 2^N \cdot \sum_{k=0}^{K-1} r_k \cdot A_{N-1:N-lk} + \sum_{k=0}^{K-1} 2^{lk} b_k \equiv$$

$$2^{l(K-1)} \sum_{k=0}^{K-1} r_k \cdot \hat{a}_{K-1-k} + \sum_{k=0}^{K-1} 2^{lk} r_k \cdot \sum_{t=0}^{K-k-2} a_t 2^{lt} + m \cdot \left( \sum_{k=0}^{K-1} r_k \sum_{t=0}^{k-1} d_{K-k+t} 2^{lt} \right) +$$

$$\sum_{k=0}^{K-1} 2^{lk} b_k = 2^{l(K-1)} \sum_{k=0}^{K-1} r_k \cdot \hat{a}_{K-1-k} + \sum_{k=0}^{K-2} \sum_{t=k}^{K-2} r_k \cdot a_{t-k} \cdot 2^{lt} +$$

$$m \cdot \left( \sum_{k=0}^{K-1} \sum_{t=0}^{k-1} r_k \cdot d_{K-k+t} \cdot 2^{lt} \right) + \sum_{k=0}^{K-1} 2^{lk} \cdot b_k = 2^{l(K-1)} \sum_{k=0}^{K-1} r_k \cdot \hat{a}_{K-1-k} +$$

$$\sum_{t=0}^{K-2} \sum_{k=0}^{t} r_k \cdot a_{t-k} \cdot 2^{lt} + m \cdot \sum_{t=0}^{K-2} \sum_{k=t+1}^{K-1} r_k \cdot d_{K-k-t} \cdot 2^{lt} + \sum_{k=0}^{K-1} 2^{lk} \cdot b_k =$$

$$2^{l(K-1)} \left( b_{K-1} + \sum_{k=0}^{K-1} r_k \cdot \hat{a}_{K-1-k} \right) + \sum_{t=0}^{K-2} 2^{lt} \cdot \left( b_t + \sum_{k=0}^{t} r_k \cdot a_{t-k} + m \sum_{k=t+1}^{K-1} r_k \cdot d_{K-k-t} \right)$$

Note that each bracket in the last equation contains a summation of K products, which can be a mixture of l×l bits and l×(l+ceil (log₂ m)) bits. The intermediate term, Z, can have up to N+l+ceil (log₂ K) bits, which reduces the size from 2N bits as a result of substitution of the modulus m for 2N in the derivation. The derived multiplication can be applied to large integer operands independent of whether N is evenly divisible by K.

The intermediate value Z produced by the last equation is not necessarily in the field ($2^N-m$), so a modulo operation is performed. In deriving the computation of the modulo, it is assumed that the bit-width of Z is N bits+M bits, and Q=M+ceil (log₂ m). The modulo Y can be computed as follows:

$$Y = (Z_{N+M-1:N} \cdot 2^N + Z_{N-1:Q} \cdot 2^Q + Z_{Q-1:0}) \mod P$$
$$= (Z_{N+M-1:N} \cdot m + Z_{N-1:Q} \cdot 2^Q + Z_{Q-1:0}) \mod P$$
$$= (Z_{N-1:Q} \cdot 2^Q + (Z_{N+M-1:N} \cdot m + Z_{Q-1:0})) \mod P$$

For small values of m, in the right-hand side of the last equality, the second term can have at most Q+1 bits. Thus, the long addition of N-bit integers is reduced to Q bits. In addition, it is possible for the sum from the last equality to exceed $2^N-m$. To avoid multiple modulo operations, which would introduce latency and reduce throughput, the disclosed methods and circuits implement the following algorithm.

1. Compute $G=Z_{N+M-1:N} \cdot m + Z_{Q-1:0}$, which is Q+1 bits long.
2. If $Z_{N-1:Q}=2^{N-Q}-1$, and $G \geq 2^Q-m$, then G=G+m.
3. $Y_{Q-1:0}=G_{Q-1:0}$ and $Y_{N-1:Q}=Z_{N-1:Q}+G_Q$.

FIG. 1 illustrates an example that shows how the disclosed methods and circuits can be applied to computation of a Poly1305 code. The example shows computation of A*R+B to produce the value of the intermediate term, Z, and computation of G per step 1 of the modulo algorithm described above. A, R, and B are 130 bits wide, and the modulus is 5. Relative to the derivation described above, N=130, m=5, K=6, l=23, and j=15.

The top four rows in the example show the partitioning of A, R, and B. A is partitioned into a-limbs a0-a5 and d-limbs d0-d5, R is partitioned into r-limbs r0-r5, and B is partitioned into b-limbs b0-b5. The partitioning of A into a-limbs, R into r-limbs, and B into b-limbs is from the LSB to MSB. In contrast, the d-limbs partitioned from A are formed from MSB to LSB.

As N=130 and K=6, the a-limbs a0 through a4 bits are 23 bits wide, and a-limb a5 is 15 bits wide. The d-limb do is 15 bits wide, and d-limbs d1-d5 are 23 bits wide. The r-limbs r0 through r4 bits are 23 bits wide, and r-limb r5 is 15 bits wide. The b-limbs b0 through b4 bits are 23 bits wide, and b-limb b5 is 15 bits wide.

The rows in section 102 show multiplication of limbs to form partial products ("intermediate z-limbs"). The organization of section 102 can correspond to a configuration of an array of arithmetic circuits configured to compute the partial products and accumulate the partial products into z-limbs. Each row shows the intermediate z-limbs generated from one of the r-limbs. In general terms, a respective set of intermediate z-limbs 0 through K−1 is generated for each r-limb i for i=0 to K−1. Row 104 shows partial products of r0 and a0 through a5. In general terms, an array of arithmetic circuits can be configured to determine for r-limb 0, intermediate z-limbs 0 through K−1 of a set 0 of intermediate z-limbs, as products of r-limb 0 and a-limbs 0 through K−1.

The rows of partial products ("sets of intermediate z-limbs") generated from r1 through r5 include partial products generated from the r-limbs and different combinations of a-limbs and the modulus-multiple of the d-limbs. For example, in the row of partial products generated from r3, d-limbs d3, d4, and d5 and the modulus 5 are used in generating the three least significant intermediate z-limbs from r3, and the next two intermediate z-limbs are generated from a0 and a1. Notably, the most significant intermediate z-limbs the rows for r-limbs r1 through r5 are products of the r-limbs and the j LSBs (15 bits) of one of the a-limbs. For example, in the row of partial products generated from r3, the most significant intermediate z-limb in that row is a product of a2 [14:0] and r3. As j bits of a2 is used to generate the partial product that is the most significant intermediate z-limb, d-limbs d3, d4, and d5 and the modulus 5 are used in generating the three least significant intermediate z-limbs from r3.

An array of arithmetic circuits can be configured to generate the sets of intermediate z-limbs from r1 through r5 as partial products of the r-limbs and different combinations of a-limbs and the modulus-multiple of the d-limbs. In general terms, the array of arithmetic circuits can be configured for each r-limb i, for i from 1 to K−1 to determine for each intermediate z-limb s from s=i to K−2 of set i, the intermediate z-limb s as a product of r-limb i and a-limb t for t−0 to K−2−i. For each intermediate z-limb s from s=0 to i−1 of set i, the array of arithmetic circuits determines intermediate z-limb s as a product of modulus, m, d-limb (K−i+s), and r-limb i. For intermediate z-limb K−1 of set i, the array of arithmetic circuits determines intermediate z-limb K−1 as a product of j low-order bits of a-limb (K−1−i) and r-limb i.

In generating the sets of intermediate z-limbs from r-limbs r0 through r5, the arithmetic circuits are configured to propagate carry bits from an arithmetic circuit that generated one intermediate z-limb in a set to the arithmetic circuit that generates the next intermediate z-limb in the set. For example, one arithmetic circuit can be configured to generate the intermediate z-limb 5*d5*r1. The carry bits resulting from that partial product are input to another arithmetic circuit to sum with the product of a0*r1.

The array of arithmetic circuits are configured to sum corresponding ones of the intermediate z-limbs from the sets of intermediate z-limbs. Row 106 shows the accumulation of the intermediate z-limbs into z-limbs z0 through z6 of Z. For example, b2+a1*r0, a1*r1, a0*r2, 5*d5*r3, 5*d4*r4, and 5*d3*r5 are corresponding intermediate z-limbs that are summed by the arithmetic circuits to generate z-limb z2. It will be recognized that the order in which corresponding ones of the intermediate z-limbs in the sets are summed can be any order.

The example of FIG. 1 shows computation of G per step 1 of the modulo algorithm described above. According to step 1 of the modulo algorithm, G is computed as the product of the most significant M bits of Z and the modulus m, summed with the least significant Q bits of Z. M is the number of bits by which Z exceeds N. A logic circuit can determine M, which is shown as z6 in row 106 of FIG. 1. Q is defined as as M+ceil ($\log_2$ m). In FIG. 1, the most significant M bits of Z are shown by block 108, which is labeled as z6. The product the most significant M bits of Z and m (e.g., m=5) can be computed by an arithmetic circuit that is configured to add the most significant M bits of Z to the value of the most significant M bits of Z left shifted by two bits, which is shown as block 110.

Figure 2:
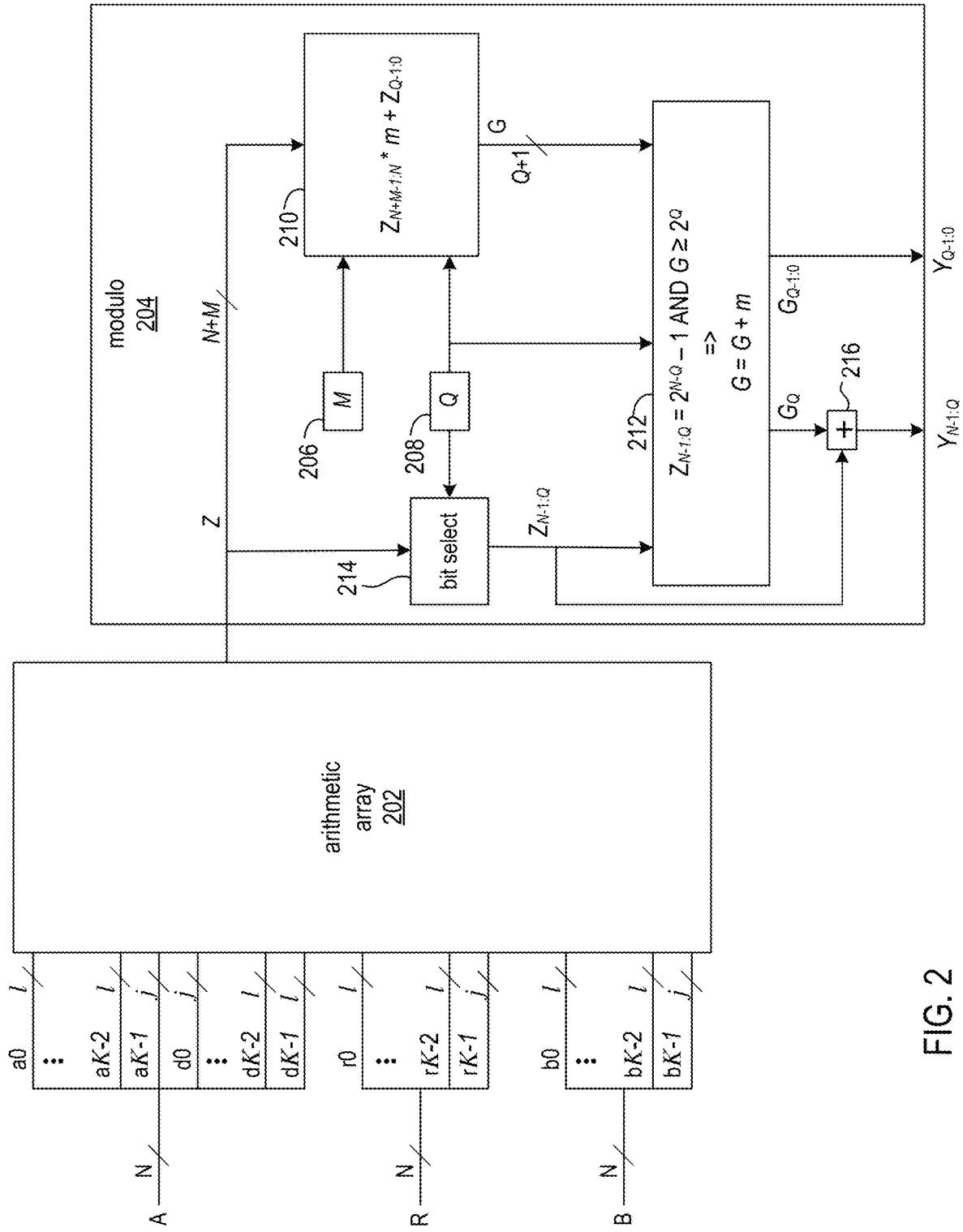
FIG. 2 shows a circuit arrangement configured to multiply integers A and R over a finite field P.

FIG. 2 shows a circuit arrangement configured to multiply integers A and R over a finite field P. The output is Y=(A*R+B) mod P as described above. The arithmetic array 202 is an array of arithmetic circuits that are configured to input the a-limbs, r-limbs, and b-limbs of the terms A, R, and B and compute Z=(A*R+B) consistent with the example of FIG. 1. The modulo circuit 204 can be a logic circuit configured to determine Y=Z mod P per the modulo algorithm described above.

Each of operands A, R, and B is N-bits wide and partitioned into K limbs. A is partitioned into two sets of limbs: a-limbs a0 through aK−1 and d-limbs do through dk−1. R is partitioned into r-limbs r0 through rK−1, and B is partitioned into b-limbs b0 through bK−1. The order of the limb numbers progresses from the LSBs to the MSBs of the operands. The a-limbs are operand A partitioned from the LSB to the MSB. Thus, a-limbs a0 through aK−2 have l bits, and aK−1 has j bits. The d-limbs are operand A partitioned from the MSB to the LSB. Thus, d-limb d0 has j bits, and d1 through dK−1 have l bits. The R and B operands are partitioned from LSB to MSB similar to operand A.

The arithmetic array 202 computes Z=(A*R+B) consistent with the example of FIG. 1, and outputs Z to the modulo circuit 204. The value of Z is represented by a total of N+M bits and is input to circuits 206, 210, and 212 of the modulo circuit 204.

M is the number of bits by which the number of bits that represent Z is greater than N. In practical use cases, m is selected to be a small integer, and Z can have N+l+ceil ($\log_2$ K) bits. Thus, M and Q can be determined from the values of l and K, and can be constants in programmable registers 206 and 208.

Circuit 210 selects bits N through (N+M−1) from Z, multiplies the value of those bits by m, and adds the product to the value of bits 0 through (Q−1) of Z to generate the value G (G is Q+1 bits). The value of G is input to logic circuit 212.

Logic circuit 212 conditionally increases the value of G by m. If the values of bits Q through (N−1) of Z are all 1 and G is greater than or equal to 29, then G is increased by m. The comparison with $2^Q$ can be performed by checking whether the MSB bit of G (bit Q of G) is 1 or 0. Circuit 214 selects bits Q through N−1 of Z.

Circuit 212 also includes selection circuitry that is responsive to the value of Q for selecting bits bits 0 through (Q−1) for output as bits 0 through (Q−1) of Y, and selecting bit Q of G to sum with bits Q through (N−1) of Z by adder circuit 216. Note that adder circuit 216 may generate a carry bit, and the carry bit can be ignored because logic circuit 212 handled the possibility of the carry bit by conditionally adjusting the value of G.

Figure 3:
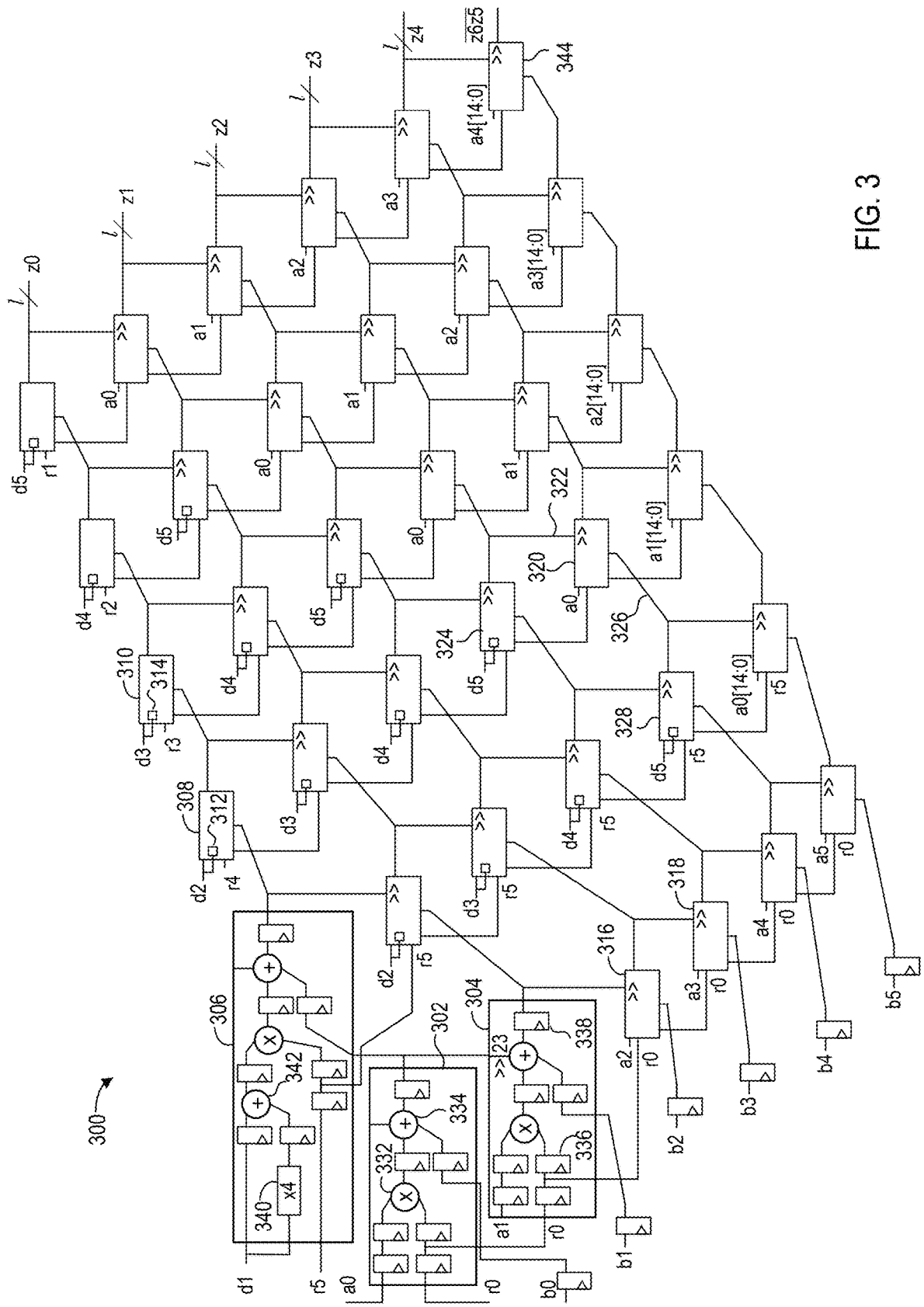
FIG. 3 shows a circuit diagram of an exemplary array of arithmetic circuits configured to determine the intermediate value of Z as described above.

FIG. 3 shows a circuit diagram of an exemplary array 300 of arithmetic circuits configured to determine the intermediate value of Z as described above. The exemplary array is K rows of K columns of arithmetic circuits by (K=6), where K is the number of limbs into which the operands are partitioned. In alternative implementations, the number of rows and columns of arithmetic circuits can be less than K, and input of the limbs can be time-multiplexed to determine Z. The order of computing the partial products from left to right is from r-limb r0 to r5, to r4, to r3, to r2, to r1. However, the order of computation of the partial products can be any order that is suitable for data pipelining in the implementation.

The arithmetic circuits can be circuits that are hardwired to multiply and accumulate input operands and that are configurable to shift and/or pre-add input operands. Exemplary arithmetic circuits include DSP48 and DSP58 circuits found in programmable devices from Xilinx, Inc., or comparable circuits in devices from other sources. The arithmetic circuits are identical instances in terms of hardwired circuitry, and individually configured to determine partial products consistent with the example of FIG. 1.

The array of arithmetic circuits is shown as being arranged in rows and columns. Each column of arithmetic circuits generates the partial products from one of the r-limbs, and each row accumulates the partial products from the arithmetic circuits in that row into a z-limb. For example, arithmetic circuits 302, 304, 316, and 318 are four of the six arithmetic circuits in the column that generates partial products from r0, and arithmetic circuits 302, 306, 308, and 310 are four of the six arithmetic circuits involved in the accumulation of partial products for z0.

For purposes of computing the z-limbs, the arithmetic circuits can be configured generally in one of two ways to compute the partial products consistent with the example of FIG. 1. Arithmetic circuits that are configured to generate partial products from a-limbs are configured as shown by arithmetic circuits 302 and 304, and arithmetic circuits that are configured to generate partial products from d-limbs are configured as shown by arithmetic circuit 306. Others of the arithmetic circuits that are configured to compute partial products from d-limbs are shown with an extra block to signify the left-shift and pre-add of the d-limb (to compute d-limb*m). For example arithmetic circuits 308 and 310 are shown with blocks 312 and 314, respectively. Others of the arithmetic circuits that are configured to compute partial products from a-limbs are shown without the extra block. For example, arithmetic circuits 316 and 318 generate partial products from a-limbs a2 and a3, respectively.

Each of the arithmetic circuits has a multiplier circuit that generates a product from two operands and an adder circuit that sums the product with one or more input operands. For example, arithmetic circuit 302 includes multiplier circuit 332 and adder circuit 334. Each of the arithmetic circuits also includes registers for staging and delaying propagation of input operands. Examples of the registers are registers 336 and 338 in arithmetic circuit 304.

The arithmetic circuits that generate partial products from the d-limbs are configured to involve pre-shift and pre-add circuitry of the arithmetic circuit. The pre-shift and pre-add circuitry implements multiplication of the d-limb by m. In the example, m=5. The pre-shift left of the d-limb by 2 bits generates the product of 4*the d-limb, and adding that product to the d-limb provides a result that is 5*d-limb. The pre-shift left by two bits is exemplified by block 340, and the pre-add is exemplified by adder 342 in arithmetic circuit 306.

With exceptions of certain ones of the arithmetic circuits, the arithmetic circuits that generate partial products input an a-limb (or partial a-limb) or d-limb, an r-limb, carry bits, and the corresponding intermediate z-limb generated by an arithmetic circuit from another r-limb. For example, arithmetic circuit 320 inputs a0, r4, carry bits on line 322 from arithmetic circuit 324, and intermediate z-limb on line 326 from arithmetic circuit 328.

For the input of carry bits to an arithmetic circuit, the value is shifted right by N/2 bits (e.g., 23 bits), because the carry bits are the upper half of the output value from another of the arithmetic circuits. For example, the output value from arithmetic circuit 302 is shifted by 23 bits by arithmetic circuit 304 for summing with the partial product of a1 and r0 and the b-limb, b1. The arithmetic circuits can be configured to shift the input operand by a specified number of bits. The arithmetic circuits that contribute to generating z-limb z0 (e.g., 302, 306, 308, 310) do not input carry bits as the arithmetic circuits are the first in each column of circuits.

The z-limbs z0, z1, z2, z3, and z4 are the low-order l bits of the output values from the respective arithmetic circuits. The output from arithmetic circuit 344 includes all the bits of the value output from arithmetic circuit, which include the bits of both z6 and z5.

Figure 4:
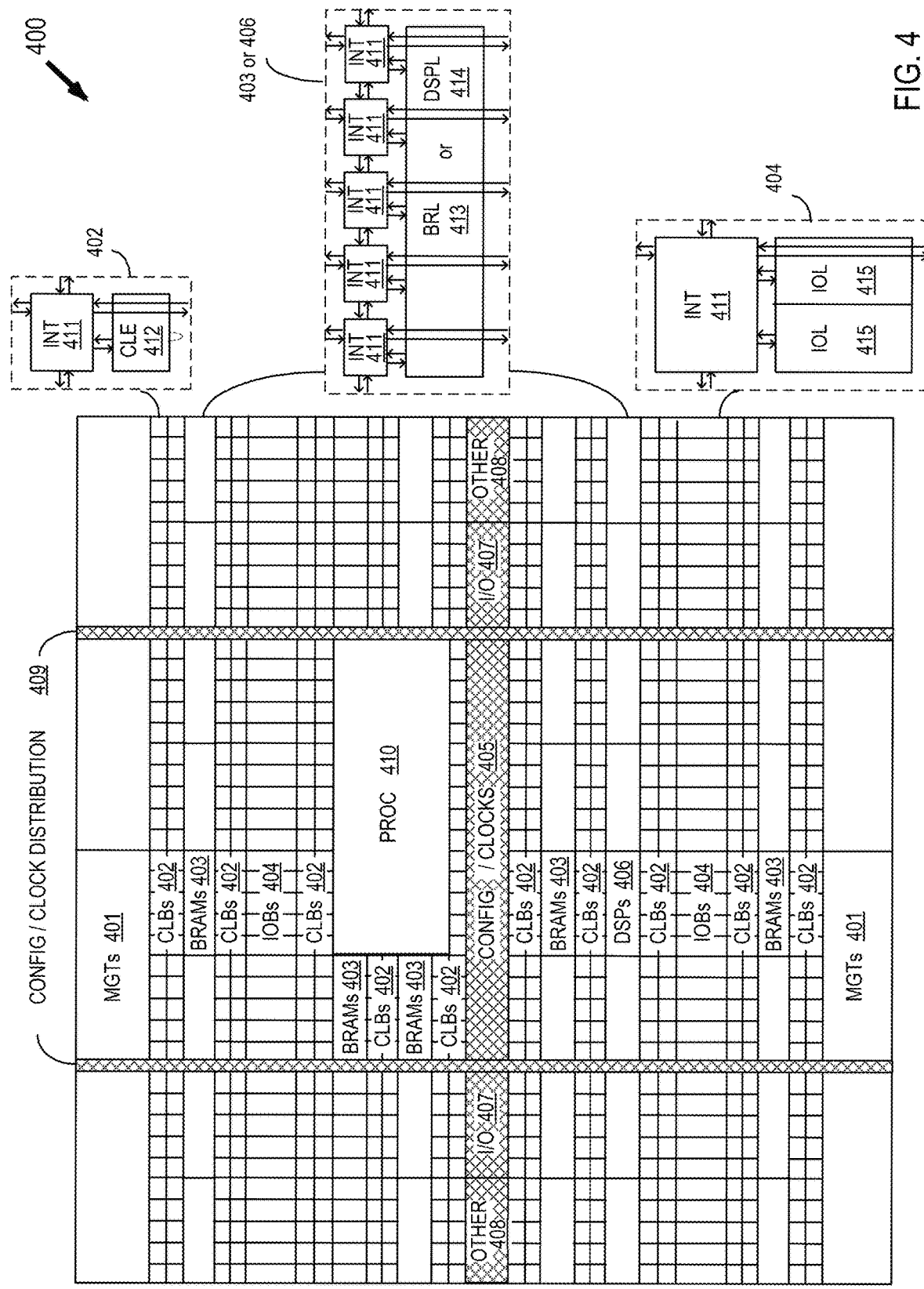
FIG. 4 shows a programmable integrated circuit on which the disclosed circuits and processes may be implemented.

FIG. 4 shows a programmable integrated circuit (IC) 400 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable IC having FPGA logic also include dedicated processor blocks (PROC) 410 and internal and external reconfiguration ports (not shown). The disclosed circuits and methods can alternatively be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 406 can include a DSP logic element (DSPL) 414 in addition to an appropriate number of programmable interconnect elements. An IOB 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

A columnar area near the center of the die (shown shaded in FIG. 4) is used for configuration, clock, and other control logic. Horizontal areas 409 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for multiplying large integers over a finite field. Other aspects and features will be apparent to those skilled in the art from consideration of the specification. The circuits and methods can be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A hardware-based circuit arrangement implemented on an integrated circuit (IC), the hardware-based circuit arrangement comprising:
    operand registers;
    an array of hardware arithmetic circuits each including a multiplier circuit and an adder circuit, configured to:
        receive, from the operand registers, a-limbs, d-limbs, r-limbs, of N-bit operands, wherein:
            the a-limbs include a-limbs 0 through K−2 of l bits and a-limb K−1 of j bits of a first operand,
            the d-limbs include d-limbs 1 through K−1 of l bits and d-limb 0 of j bits of the first operand, and
            the r-limbs include r-limbs 0 through K−2 of l bits and r-limb K−1 of j bits of a second operand;
        generate, using the multiplier circuit, an intermediate term, Z, having z-limbs 0 through K by determining respective sets of intermediate z-limbs 0 through K−1 for r-limbs i for i=0 to K−1, and, using the adder circuit to sum corresponding ones of the intermediate z-limbs of sets i through K−1;
        determine, using the multiplier circuit, for r-limb 0, intermediate z-limbs 0 through K−1 of set 0 as products of r-limb 0 and a-limbs 0 through K−1;
        determine, for each r-limb i, for i from 1 to K−1,
            the intermediate z-limb s from s=0 to i−1 of set i, as a product of modulus, m, d-limb (K−i+s), and r-limb i,
            the intermediate z-limb K−1 of set i, as a product of j low-order bits of a-limb (K−1−i) and r-limb i; and the intermediate z-limb s from s=i to K−2 of set i, as a product of r-limb i and a-limb t for t=0 to K−2−i;

a modulo circuit coupled to the array of hardware arithmetic circuits and comprising:

circuitry configured to compute G as (most significant M bits of Z*m)+(least significant Q bits of Z), wherein M is a number of bits by which a number of bits of Z exceeds N, and Q is equal to M+ceil ($\log_2$ m), circuitry configured to increase G by m in response to bits Q through N−1 of Z all having bit value one, and G≥$2^Q$−m; and circuitry configured to assign bits G bits 0 through Q−1 to Y bits 0 through Q−1, and G bit Q to Y bit Q.

2. The hardware-based circuit arrangement of claim 1, wherein a subset of the array of hardware arithmetic circuits is configured to:

input b-limbs that include b-limbs 0 through K−2 of l bits and b-limb K−1 of j bits of a third operand;

determine for r-limb 0, intermediate z-limbs 0 through K−1; and sum the b-limbs with the intermediate z-limbs 0 through K−1.

3. The hardware-based circuit arrangement of claim 1, wherein the array of hardware arithmetic circuits is configured to:

input b-limbs that include b-limbs 0 through K−2 of l bits and b-limb K−1 of j bits of a third operand; and determine each z-limb as a sum of corresponding ones of the intermediate z-limbs of sets i through K−1 and the b-limbs.

4. The hardware-based circuit arrangement of claim 1, wherein respective ones of the array of hardware arithmetic circuits are configured to determine the intermediate z-limbs 0 through K−1 for each r-limb i.

5. The hardware-based circuit arrangement of claim 1, wherein a respective subset of the array of hardware arithmetic circuits is configured to determine the respective set of intermediate z-limbs 0 through K−1 for each r-limb i for i=0 to K−1.

6. The hardware-based circuit arrangement of claim 5, wherein the array of hardware arithmetic circuits is configured to:

propagate each intermediate z-limb t for t=0 to K−1 of set i for i<K−1, from one hardware arithmetic circuit of the array of hardware arithmetic circuits to the adder circuit of another hardware arithmetic circuit of the array of hardware arithmetic circuits for summing with intermediate z-limb t of set i+1; and propagate carry bits of each intermediate z-limb x for x=0 to K−2 of set i, from one hardware arithmetic circuit of the array of hardware arithmetic circuits to the adder circuit of another hardware arithmetic circuit of the array of hardware arithmetic circuits for summing with intermediate z-limb x+1 of set i.

7. The hardware-based circuit arrangement of claim 1, wherein N=130 and m=5.

8. The hardware-based circuit arrangement of claim 7, wherein the array of hardware arithmetic circuits is configured to:

input d-limb (K−i+s) as a first operand to the adder circuit of a hardware arithmetic circuit of the array of hardware arithmetic circuits;

input d-limb (K−i+s) to a shift circuit of the hardware arithmetic circuit, and shift d-limb (K−i+s) left by two bits to generate a 4x−d-limb (K−i+s);

input the 4x−d-limb (K−i+s) as a second operand to the adder circuit; and provide a sum from the adder circuit to a multiplier of the hardware arithmetic circuit.

9. The hardware-based circuit arrangement of claim 1, wherein the array of hardware arithmetic circuits includes K sets of K hardware arithmetic circuits.

10. The hardware-based circuit arrangement of claim 1, wherein the array of hardware arithmetic circuits is an H×H array of hardware arithmetic circuits, H<K, the array of hardware arithmetic circuits is configured to input time-multiplexed ones of the a-limbs, r-limbs, and d-limbs.

11. A method for implementing a hardware-based circuit arrangement on an integrated circuit (IC), the method comprising:

receiving, from operand registers, a-limbs, d-limbs, r-limbs, of N-bit operands to a plurality of hardware arithmetic circuits, wherein:

the a-limbs include a-limbs 0 through K−2 of l bits and a-limb K−1 of j bits of a first operand, the d-limbs include d-limbs 1 through K−1 of l bits and d-limb 0 of j bits of the first operand, and the r-limbs include r-limbs 0 through K−2 of l bits and r-limb K−1 of j bits of a second operand;

generating, using a multiplier circuit of each hardware arithmetic circuit of the plurality of hardware arithmetic circuits, an intermediate term, Z, having z-limbs 0 through K, wherein:

the determining includes determining using the multiplier circuit of each of the plurality of hardware arithmetic circuits, a respective set of intermediate z-limbs 0 through K−1 for each r-limb i for i=0 to K−1, determining for r-limb 0, intermediate z-limbs 0 through K−1 of set 0 as products of r-limb 0 and a-limbs 0 through K−1;

for each r-limb i, for i from 1 to K−1, determining for each intermediate z-limb s from s=0 to i−1 of set i, the intermediate z-limb s as a product of modulus, m, d-limb (K−i+s), and r-limb i, determining intermediate z-limb K−1 of set i as a product of j low-order bits of a-limb (K−1−i) and r-limb i;

determining for each intermediate z-limb s from s=i to K−2 of set i, the intermediate z-limb s as a product of r-limb i and a-limb t for t=0 to K−2−i; and determining each z-limb as a sum of corresponding ones of the intermediate z-limbs of sets i through K−1;

computing, using circuitry of a modulo circuit, a value of G as (most significant M bits of Z*m)+(least significant Q bits of Z), wherein M is a number of bits by which a number of bits of Z exceeds N, and Q is equal to M+ceil ($\log_2$ m);

increasing, using the circuitry of the modulo circuit, G by m by the modulo circuit, in response to bits Q through N−1 of Z all having bit value one, and G≥$2^Q$−m; and assigning, using the circuitry of the modulo circuit, bits G bits 0 through Q−1 to Y bits 0 through Q−1, and G bit Q to Y bit Q.

12. The method of claim 11, wherein:

the receiving includes receiving b-limbs that include b-limbs 0 through K−2 of l bits and b-limb K−1 of j bits of a third operand; and the determining for r-limb 0, intermediate z-limbs 0 through K−1 includes summing b-limbs 0 through K−1 with the intermediate z-limbs 0 through K−1 by the plurality of hardware arithmetic circuits that determined the products of r-limb 0 and a-limbs 0 through K−1.

13. The method of claim 11, wherein:
the receiving includes receiving b-limbs that include b-limbs 0 through K−2 of 1 bits and b-limb K−1 of j bits of a third operand; and
the determining each z-limb as a sum, includes determining each z-limb as a sum of corresponding ones of the intermediate z-limbs of sets i through K−1 and the b-limbs.

14. The method of claim 11, wherein the determining the respective set of intermediate z-limbs 0 through K−1 for each r-limb i for i=0 to K−1 includes, determining the intermediate z-limbs 0 through K−1 for r-limb i by respective ones of the plurality of hardware arithmetic circuits.

15. The method of claim 11, wherein the determining the respective set of intermediate z-limbs 0 through K−1 for each r-limb i for i=0 to K−1 includes, determining the respective set by a respective subset of the plurality of hardware arithmetic circuits.

16. The method of claim 15, wherein the determining each z-limb as a sum of corresponding ones of the intermediate z-limbs of sets i through K−1 includes:
propagating each intermediate z-limb t for t=0 to K−1 of set i for i<K−1, from one hardware arithmetic circuit of the plurality of hardware arithmetic circuits to an adder circuit of another hardware arithmetic circuit of the plurality of hardware arithmetic circuits for summing with intermediate z-limb t of set i+1; and
propagating carry bits of each intermediate z-limb x for x=0 to K−2 of set i, from one hardware arithmetic circuit of the plurality of hardware arithmetic circuits to an adder circuit of another hardware arithmetic circuit of the plurality of hardware arithmetic circuits for summing with intermediate z-limb x+1 of set i.

17. The method of claim 11, wherein N=130 and m=5.

18. The method of claim 17, wherein the determining for each intermediate z-limb s from s=0 to i−1 of set i, the intermediate z-limb s as a product of modulus, m, d-limb (K−i+s), and r-limb i, includes:
inputting d-limb (K−i+s) as a first operand to an adder circuit of a hardware arithmetic circuit of the plurality of hardware arithmetic circuits;
inputting d-limb (K−i+s) to a shift circuit of the hardware arithmetic circuit, and shifting d-limb (K−i+s) left by two bits to generate a 4x−d-limb (K−i+s);
inputting the 4x−d-limb (K−i+s) as a second operand to the adder circuit; and
providing a sum from the adder circuit to the multiplier circuit of the hardware arithmetic circuit.

19. The method of claim 11, wherein the determining the respective set of intermediate z-limbs 0 through K−1 for each r-limb i for i=0 to K−1 includes determining the respective sets by K sets of K hardware arithmetic circuits.

20. The method of claim 11, wherein the plurality of hardware arithmetic circuits is an H×H array of hardware arithmetic circuits, wherein H<K, and the determining the respective set of intermediate z-limbs 0 through K−1 for each r-limb i for i=0 to K−1 includes:
time-multiplexing inputting of the a-limbs, r-limbs, and d-limbs to the array of hardware arithmetic circuits; and
determining the respective sets by array of hardware arithmetic circuits.

\* \* \* \* \*